Dec. 7, 1971 C. P. RICKERD 3,624,991
FRUIT CATCHER AND CONVEYOR ASSEMBLY
Filed June 4, 1970 2 Sheets-Sheet 2
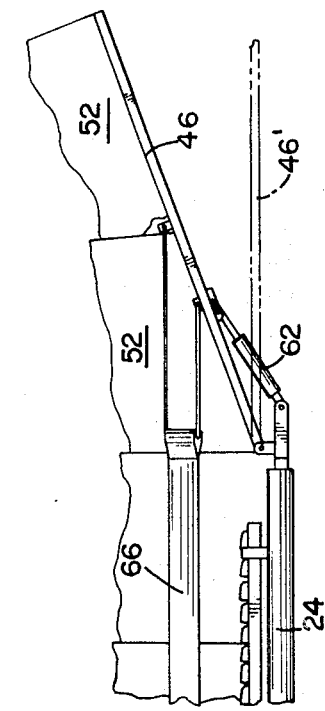
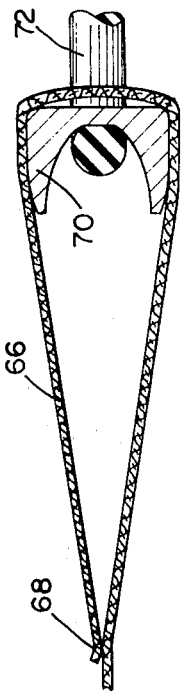
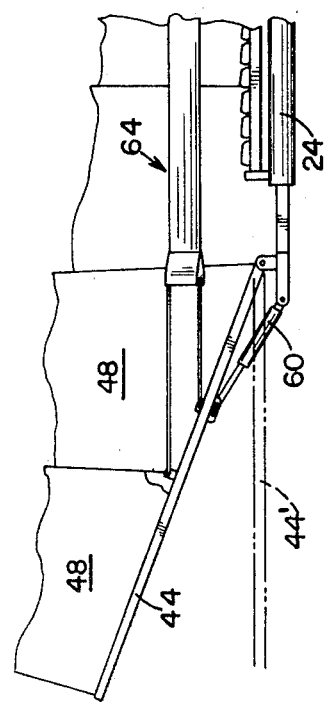
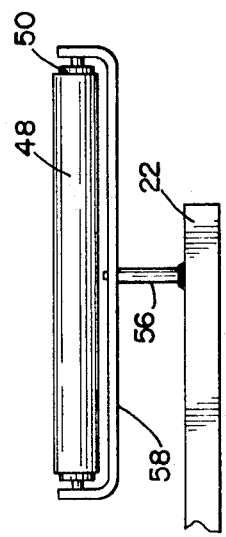
INVENTOR
CALVIN P. RICKERD
BY *Neal C. Johnson*
ATT'Y.

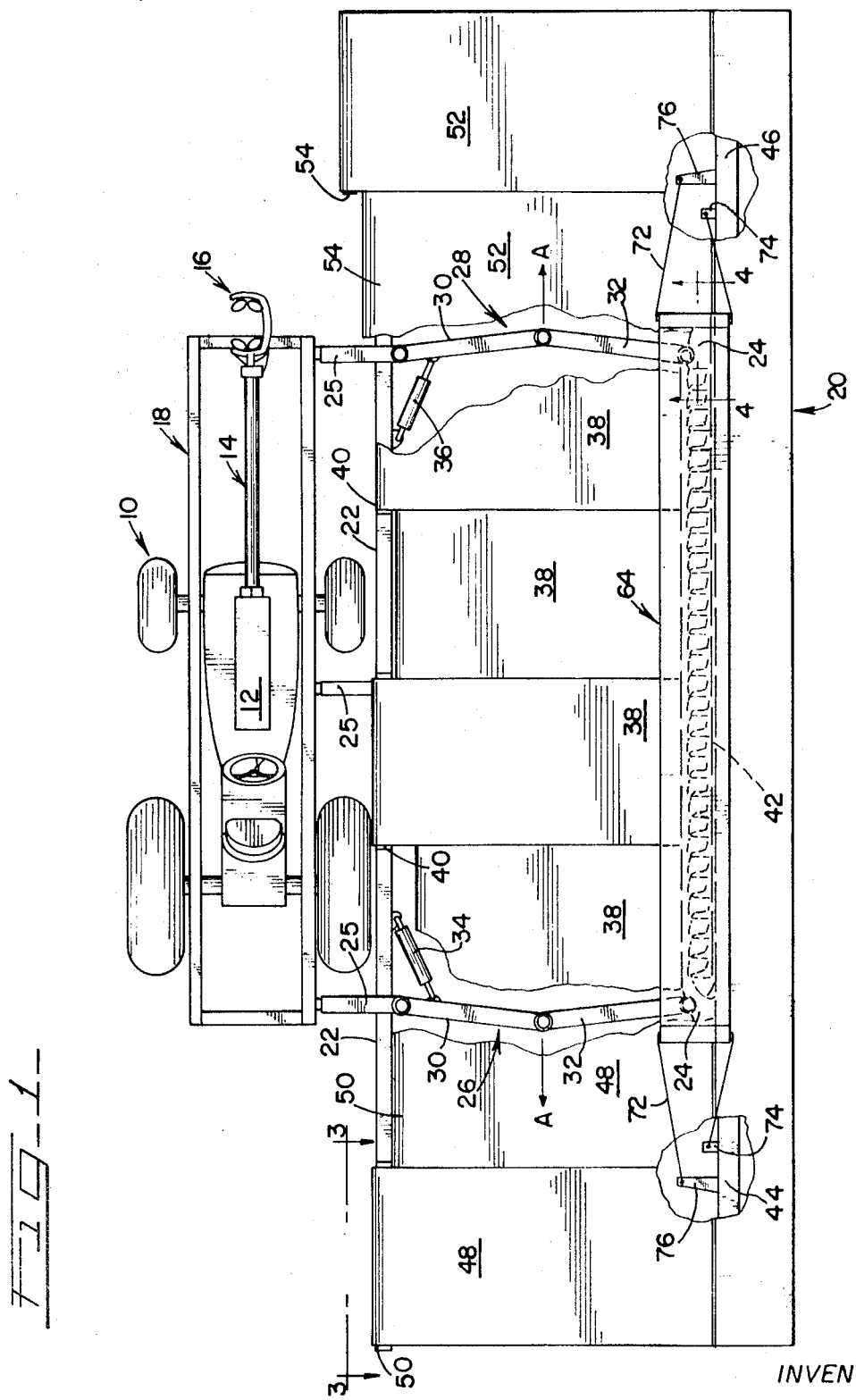

United States Patent Office 3,624,991
Patented Dec. 7, 1971

3,624,991
FRUIT CATCHER AND CONVEYOR ASSEMBLY
Calvin P. Rickerd, 523 N. Catherine,
La Grange, Ill. 60525
Filed June 4, 1970, Ser. No. 43,491
Int. Cl. A01g *19/06*
U.S. Cl. 56—329
6 Claims

ABSTRACT OF THE DISCLOSURE

A fruit harvesting machine including a prime mover upon which is mounted a boom, a tree clamp, and a shaker mechanism. A catcher and conveyor assembly extends laterally from the prime mover for powered extension toward a tree to be harvested for catching fruit shaken from the tree and conveying the fruit to a suitable collection point. The assembly is arranged for powered retraction to a transport position. A conveyor of the assembly is covered by a deflector strip to prevent tree-borne fruit from falling directly onto the conveyor. The deflector strip is mounted in a manner whereby it can be raised to a position in spaced relation above the conveyor to permit fruit to move beneath the deflector strip and onto the conveyor.

BACKGROUND OF THE INVENTION

(1) Field of the invention

The invention relates generally to a mechanized fruit harvester and more particularly to an improved catcher and conveyor assembly of the harvester.

(2) Prior art

In U.S. Pats. 3,347,032 and 3,462,931, for example, fruit harvesters are shown which include fruit catching and conveying assemblies which are positionable beneath a tree to be harvested for catching and then conveying fruit to a suitable collection point. Each harvester includes an endless conveyor (shown at 97 in Pat. No. 3,347,032 and at 27 in Pat. No. 3,462,931) for conveying fruit received from the surfaces of the catcher assembly.

It will be seen that at least the working or conveying run of each conveyor is exposed along its length and is thus in a position wherein fruit falling from a tree may directly strike the conveyor. Since the conveyor is normally constructed of materials which are much less resilient or unyielding than the adjacent catching aprons, the fruit striking the conveyor is more likely to be bruised and damaged.

A further problem associated with catcher and conveyor assemblies occurs in conjunction with positioning the assembly beneath a tree to be harvested. The fruit trees may include low hanging branches with which the assembly may become entangled as the assembly is extended beneath the tree. This can result in broken branches and damaged or lost fruit.

SUMMARY

The invention provides an improved catcher and conveyor assembly wherein a deflector strip is suspended over the conveyor to prevent tree-borne fruit from falling directly onto the conveyor. The deflector strip is preferably constructed of a resilient or yielding material (a rubberized fabric, for example) so that fruit falling thereon will not be bruised or damaged. The deflector strip is arranged for disposition on the assembly in a first position wherein it does not significantly increase the dimensions and profile of the assembly, with the result that the problem of entanglement with low hanging branches is minimized.

The assembly includes means for raising the deflector strip to a second position in spaced relation above the conveyor so that fruit received on the catcher portions can move beneath the deflector strip and onto the conveyor.

It is an object of the invention to provide an improved fruit catcher and conveyor assembly which is arranged to reduce the possibility of bruising and damaging fruit during a harvesting operation.

It is another object to provide a catcher and conveyor assembly which provides the foregoing object while at the same time minimizing the problem of entanglement with or damage to the tree to be harvested.

It is another object to provide a catcher and conveyor assembly which provides the foregoing objects by means of a simple and inexpensive arrangement.

BRIEF DESCRIPTION OF THE DRAWINGS

FIG. 1 is a plan view of a fruit harvester including the improved catcher and conveyor assembly of the invention;

FIG. 2 is a fragmentary front elevation view of the catcher and conveyor assembly;

FIG. 3 is a fragmentary elevation view in the direction of arrows 3—3 of FIG. 1; and FIG. 4 is an enlarged fragmentary sectional view taken in the direction of arrows 4—4 of FIG. 1.

DESCRIPTION OF PREFERRED EMBODIMENT

Referring first to FIG. 1, there is shown a tractor 10 of the agricultural type upon which is mounted a shaker mechanism 12, an extensible boom 14, and a tree-engaging clamp 16. A framework shown generally at 18 is mounted on the tractor 10 for supporting a fruit-catching and conveying assembly 20.

In essence, the assembly 20 includes an inner frame member 22 and an outer frame member 24 arranged in substantially parallel relation. The frame member 22 is supported from the framework 18 by laterally extending arms shown at 25. The frame members 22 and 24 are interconnected by a pair of foldable arm assemblies 26 and 28. Each arm assembly includes an inner arm 30 pivotally connected to the inner frame member 22 and an outer arm 32 pivotally connected to the outer frame member 24. The inner and outer arms of each arm assembly are pivotally interconnected approximately midway between the inner and outer frame members as shown. Each of the pivot connections provides a substantially vertical pivot axis so that the arm assemblies 26 and 28 are foldable in a common substantially horizontal plane.

A pair of hydraulic cylinder units 34 and 36 are connected between the inner frame member 22 and arm assemblies 26 and 28 respectively as shown. It will be apparent that simultaneous extension of the cylinder units 34 and 36 causes the arm assemblies 26 and 28 to fold in the direction of the arrows A, thereby retracting the outer frame member 24 inwardly toward and parallel to the inner frame member 22. Retraction of the cylinder units 34 and 36 moves the arm assemblies in the opposite direction to move the outer frame member 24 outwardly from the inner frame member 22 to thus extend the assembly 20.

Although unnecessary for an understanding of the present invention, the frame 18 and assembly 20 may be constructed in accordance with the details shown in assignee's copending application Ser. No. 867,103 filed Oct. 16, 1969 and entitled "Fruit Catcher and Conveyor System."

The catcher and conveyor assembly 20 includes a plurality of flexible webs 38 of rubberized fabric disposed in outwardly and downwardly inclined relation from the inner frame member 22 to the outer frame member 24. The outer end of each web 38 is suitably secured to the frame member 24. The inner end of each web 38 is secured on a respective self-winding roller 40. The rollers 40 are mounted on the inner frame member 22 in the staggered or offset positions shown so that the edges of the webs 38 are arranged in overlapping relation. The webs 38 thus define a continuous substantially coplanar surface for catching fruit from a tree and for gravity feeding of the collected fruit toward a suitable conveyor system.

In the illustrated embodiment, the conveyor system includes an endless conveyor 42 mounted on the frame member 24 and disposed so as to receive fruit gravity-fed by the webs 38. The conveyor 42 then conveys the fruit to a suitable collection point (not shown).

The catcher and conveyor assembly 20 further includes a pair of catcher extensions flanking the above described surface defined by the webs 38 and also flanking the ends of the conveyor 42. As best shown in FIG. 2, a pair of beams 44 and 46 are pivotally connected to the opposite ends of the frame member 24. A pair of webs 48 similar to the webs 38 are arranged with the outer ends thereof suitably secured to the beam 44. The webs 48 are inclined upwardly toward the inner frame member 22. The inner ends of the webs 48 are secured on respective self-winding rollers 50 which are mounted on the frame member 22. Similarly, a pair of webs 52 are secured between the beam 46 and self-winding rollers 54 mounted on the frame member 22. It will be understood that the catcher extension defined by the webs 48, the surface defined by the webs 38, and the other catcher extension defined by the webs 52 define a continuous, substantially coplanar surface when the beams 44 and 46 are disposed in longitudinal coaxial alignment with the frame member 24 as shown in dotted lines in FIG. 2.

Each of the rollers 40, 50, and 54 may be supported on the inner frame member 22 by means shown in FIG. 3. A vertical post 56 extends upwardly from the frame member 22 for receiving a yoke 58 thereon. The yoke 58 supports the roller 50 upon which the web 48 is wound.

As shown in FIG. 2, hydraulic cylinder units 60 and 62 are pivotally connected between the opposite ends of the frame member 24 and the beams 44 and 46 respectively. It will be seen that extension and retraction of the cylinder units 60 and 62 pivots the beams 44 and 46 between the dotted line and solid line positions in FIG. 2. When raised to the solid line position, the catcher extensions defined by the webs 48 and 52 are disposed to gravity-feed fruit toward the surface defined by the webs 38 and toward the conveyor 42.

In accordance with the invention, a deflector 64 is connected between the beams 44 and 46 so as to extend over the exposed length and width of the conveyor 42. The deflector 64 includes a strip 66 constructed of a rubberized fabric the same or similar to the material of the above described webs. Each end of the strip 66 is rolled back upon itself as shown in FIG. 4 and secured by by stitching 68 to form a loop through which a channel member 70 extends across the width of the strip 66.

The deflector 64 includes resilient means disposed in tension for suspending the deflector strip 66 between the beams 44 and 46. A pair of cords 72 of elastomeric and resilient material are connected between the opposite ends of the deflector strip 66 and the respective beams 44 and 46. The ends of each cord 72 are secured to a pair of brackets 74 and 76 mounted on the respective beams 44 and 46. As shown in FIG. 4, the cords 72 extend within the respective channel members 70 at each end of the strip 66.

It has been found that connecting the ends of each cord 72 to a pair of spaced-apart brackets instead of to a single bracket, serves to prevent the deflector 64 from twisting out of a substantially horizontal plane. Moreover, the maintenance of the deflector 64 in a substantially horizontal plane is assisted by the placement of the brackets 74 just above the webs adjacent thereto and the brackets 76 just below the webs adjacent thereto. This arrangement is preferred since it compensates to some degree for the slope or inclination of the catcher and conveyor assembly 20 when the same is disposed beneath a tree to be harvested.

It will be seen that since the cords 72 are disposed in tension, the deflector strip 66 will be maintained in taut relation and in a position closely adjacent the underlying surfaces of the assembly 20 so as to be substantially coplanar therewith when the beams 44 and 46 are disposed in the dotted line positions in FIG. 2. Accordingly, the assembly 20 may be extended beneath a tree to be harvested without any significant probability of the deflector structure becoming entangled with low hanging branches.

Upon actuating the cylinder units 60 and 62 to raise the catcher extensions as shown in FIG. 2, it will be apparent that the deflector 64 is raised to a level above the conveyor 42. The tension in the cords 72 maintains the strip 66 in taut relation so that fruit may move therebeneath onto the conveyor 42 at any point along its length.

From the foregoing it will be seen that the invention provides an improved catcher and conveyor assembly which is simple in construction and effective in accomplishing the desired results.

What is claimed is:

1. In a fruit harvester of the type including a mobile support and a catcher assembly mounted on said support for extension toward and retraction from a tree to be harvested, a conveyor on said catcher assembly, said catcher assembly inclunding a pair of pivotally mounted extensions disposed at opposite longitudinal ends of the conveyor for gravity feed of fruit thereon toward the conveyor when the extensions are pivoted upwardly, wherein the improvement comprises:

deflector means connected between said pair of extensions and extending over said conveyor to prevent tree-borne fruit from falling directly onto said conveyor; and means operatively associated with said extensions for pivoting said extensions upwardly relative to said conveyor to dispose said deflector means in spaced relation above said conveyor to permit fruit on the catcher assembly to move beneath said deflector means and onto said conveyor.

2. In a fruit-catching and conveying assembly adapted for disposition beneath a tree to be harvested, wherein the assembly includes a conveyor and a pair of catcher extensions pivotally mounted at opposite longitudinal ends of the conveyor for gravity feed of fruit toward the conveyor, the improvement comprising:

deflector means connected between said pair of extensions and extending over said conveyor to prevent tree-borne fruit from falling directly onto said conveyor; and means coupled to said extensions for pivoting said extensions upwardly relative to said conveyor to dispose said deflector means in spaced relation above said conveyor to permit fruit on the catcher assembly to move beneath said deflector means and onto said conveyor.

3. The subject matter of claim 2, wherein said deflector means includes an elongate strip having a length and width at least coextensive with the length and width of said conveyor.

4. The subject matter of claim 3, wherein said strip is connected to said catcher extensions by means including resilient means disposed in tension.

5. In a fruit-catching and conveying assembly adapted for disposition beneath a tree to be harvested, wherein the assembly includes a conveyor, a fruit-catching surface inclined toward said conveyor, and a pair of catcher extensions flanking said surface and pivotable relative thereto between a first position substantially coplanar therewith and a second raised position for gravity feed of fruit toward the conveyor, the improvement comprising:

deflector means connected between said catcher extensions and extending over said conveyor to prevent tree-borne fruit from falling directly onto said conveyor, said deflector means being disposed in substantially coplanar relation with said fruit-catching surface when said catcher extensions are disposed in said first position; and means coupled to said extensions for pivoting said extensions to said second position to dispose said deflector means in spaced relation above said conveyor whereby fruit may move beneath said deflector means and onto said conveyor.

6. The subject matter of claim 5, wherein said deflector means is connected to said catcher extensions by means including resilient means disposed in tension.

References Cited
UNITED STATES PATENTS

| | | | |
|---|---|---|---|
| 3,531,925 | 10/1970 | Vines et al. | 56—329 |
| 3,541,773 | 11/1970 | Cate | 56—329 |
| 3,548,579 | 12/1970 | Shipley, Jr. | 56—329 |

LOUIS G. MANCENE, Primary Examiner

J. A. OLIFF, Assistant Examiner